US00RE40272E

(19) United States
(12) Reissued Patent
Chan

(10) Patent Number: US RE40,272 E
(45) Date of Reissued Patent: Apr. 29, 2008

(54) FOLDABLE WRITING IMPLEMENT

(75) Inventor: Sik-Leung Chan, Tsuen Wan (HK)

(73) Assignee: C. C. & L Company Limited, Hong Kong (HK)

(21) Appl. No.: 10/967,116

(22) Filed: Oct. 15, 2004

Related U.S. Patent Documents

Reissue of:
(64) Patent No.: 6,464,419
Issued: Oct. 15, 2002
Appl. No.: 09/854,085
Filed: May 11, 2001

(51) Int. Cl.
*B43K 23/02* (2006.01)

(52) U.S. Cl. ..... 401/131; 401/6; 401/99; 401/195

(58) Field of Classification Search ..... 401/6, 401/29, 52, 95, 99, 104–114, 131, 195; D19/46
See application file for complete search history.

(56) References Cited

U.S. PATENT DOCUMENTS 1,810,109 A * 6/1931 McEnery ..... 401/52
3,257,991 A * 6/1966 Mosch ..... 401/229
4,081,217 A * 3/1978 Klaber ..... 401/131
4,149,812 A 4/1979 Huffman, Jr.
5,061,104 A * 10/1991 Florjancic ..... 401/195

FOREIGN PATENT DOCUMENTS

JP 1211875 5/2001

* cited by examiner

*Primary Examiner*—Tuan Nguyen
(74) *Attorney, Agent, or Firm*—Daniel P. Burke & Associates, PLLC

(57) ABSTRACT

A ball point pen has a elongate shank 10 that supports a ball point element inside. A handle 11 can pivot and fold over and be held closed against the shank 10. This allows the pen to be maintained in a folded-up configuration and easily carried in a breast pocket or purse. The pen is biassed towards a writing configuration with the shank and handle connected end-to-end.

24 Claims, 3 Drawing Sheets

FOLDABLE WRITING IMPLEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to writing implements.

2. Description of Prior Art

Writing implements are presently provided for writing use and for carrying in a breast pocket. As such, it is normally a requirement that the nib, a ball or pencil point is covered for carrying. A separate over may be easily misplaced or lost. In some cases, the nib or pencil point, say, is retracted so as not to be exposed when not is use and so as not to soil the fabric of the pocket when inserted into and removed from the pocket, and no separate cover is required. A writing implement may be itself relatively short, but never-the-less each writing instrument must be sufficiently long for normal use and preferably 'balanced' so that as to be comfortable for writing. This means that a normal writing implement is relatively long and does not fit easily into a shallow breast pocket that may be present on a shirt, or fit comfortably into a short purse or wallet.

SUMMARY OF THE INVENTION

It is an object of the invention to overcome or at least reduce these problems.

According to the invention there is provided a writing implement having a writing head supported by an elongate shank and an elongate handle that fits end-to-end to the shank in a writing configuration for normal use, in which the handle is pivotable connected to the shank and folds over the shank and is held against the shank the implement is in a folded configuration.

The pivotable connection is preferably spring biassed to restrain the shank and handle towards the writing configuration.

A remote end of the handle may manually releasably lock to a remote end of the shank to hold the writing implement in the folded position.

The handle preferably extends over an end of the shank and the writing head in the folded configuration.

A pocket clip may be mounted to and extending along a side of the handle.

BRIEF DESCRIPTION OF THE DRAWINGS

A ball-point pen according to the invention will now be described by way of example with reference to the accompanying drawings in which.

DESCRIPTION OF THE PREFERRED EMBODIMENT

Figure 1:
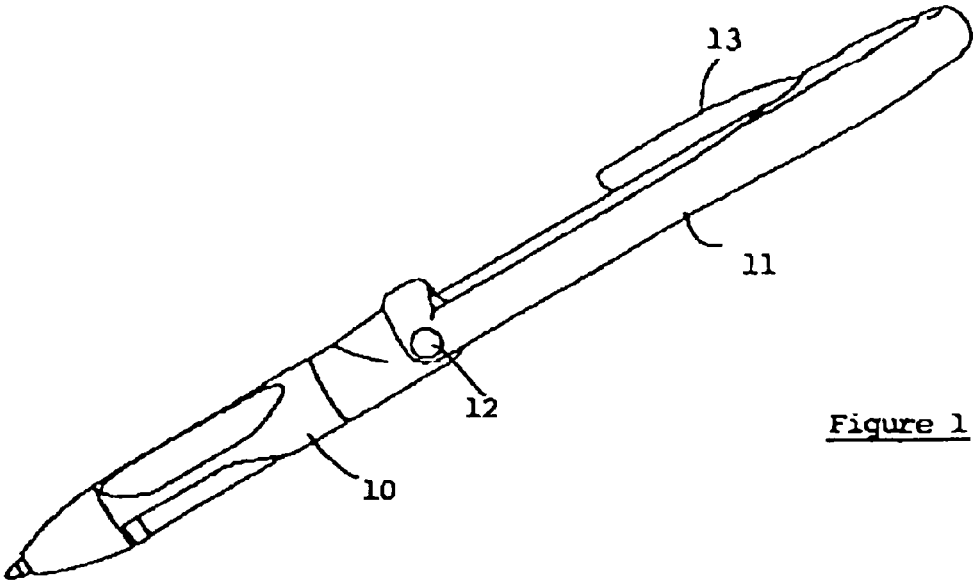
FIG. 1 is an isometric view of the pen in a writing configuration.
Figure 2:
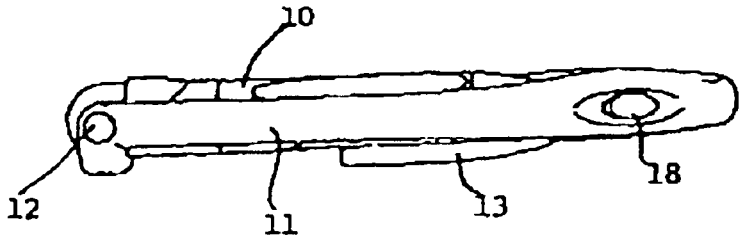
FIG. 2 is a isometric view of the pen in a folded configuration.
Figure 3:
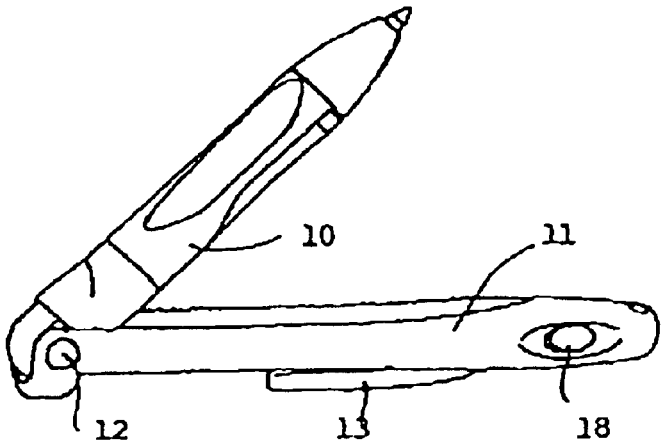
FIG. 3 is an isometric view of the pen in an intermediate configuration.

Referring to the drawings, in FIGS. 1 to 3, the pen has an elongate shank 10 and an elongate handle 11. The shank and handle are pivotably connected together by a pin 12. A pocket clip 13 is mounted to the handle 11. The handle and shank fit together end-to-end in FIG. 1 and in FIG. 2 the handle surrounds the shank 10 in the folded configuration.

Figure 4:
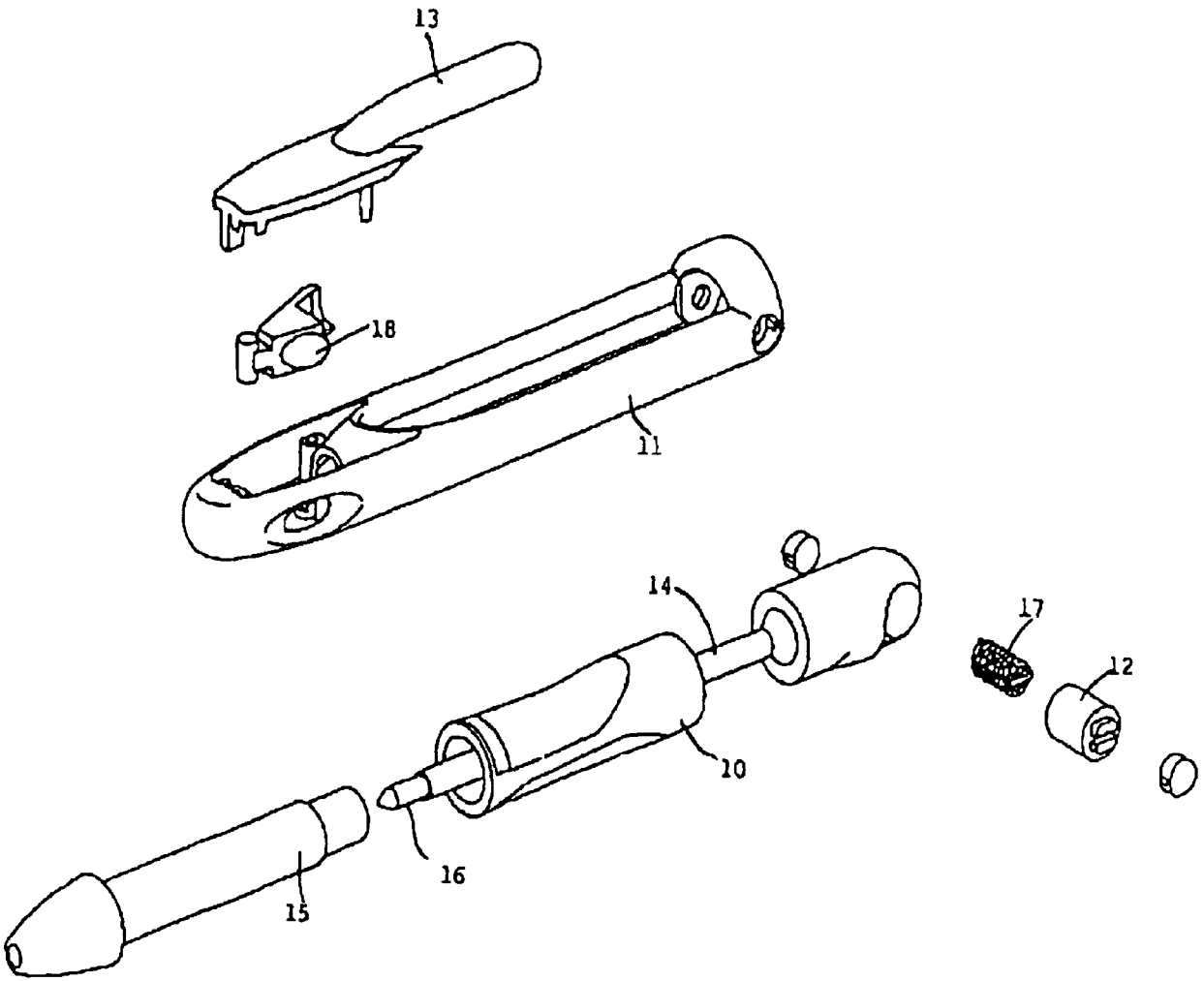
FIG. 4 is an isometric exploded view of the pen.

In FIG. 4, the shank 10 supports a replaceable ball point element 14 and a shroud 15, that push-fits into the shank 10, covers part of the element 14 and supports a writing head 16 as required. The pivot pin 12 is provided with a biassing spring 17 that biasses the pen towards the writing configuration. The handle 11 has a pivotably manually releasable button 18 that is releasable to allow the spring 17 to open the pen from its folded configuration.

Figure 5:
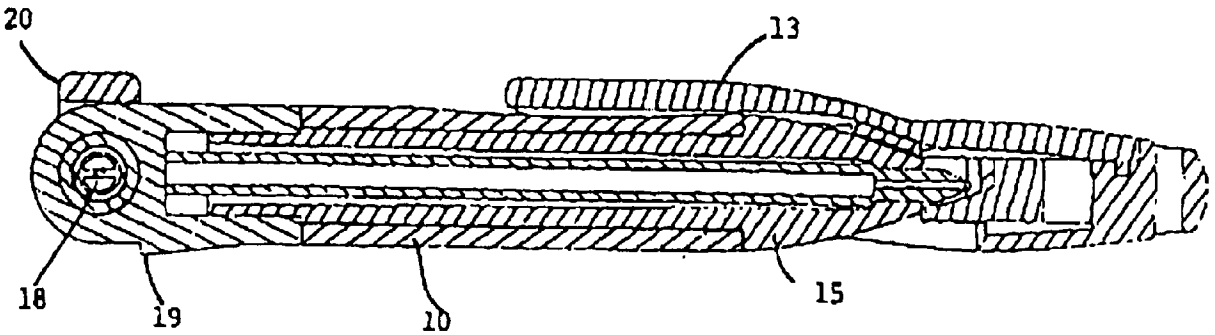
FIG. 5 is a sectional view of the pen in the folded configuration.
Figure 6:
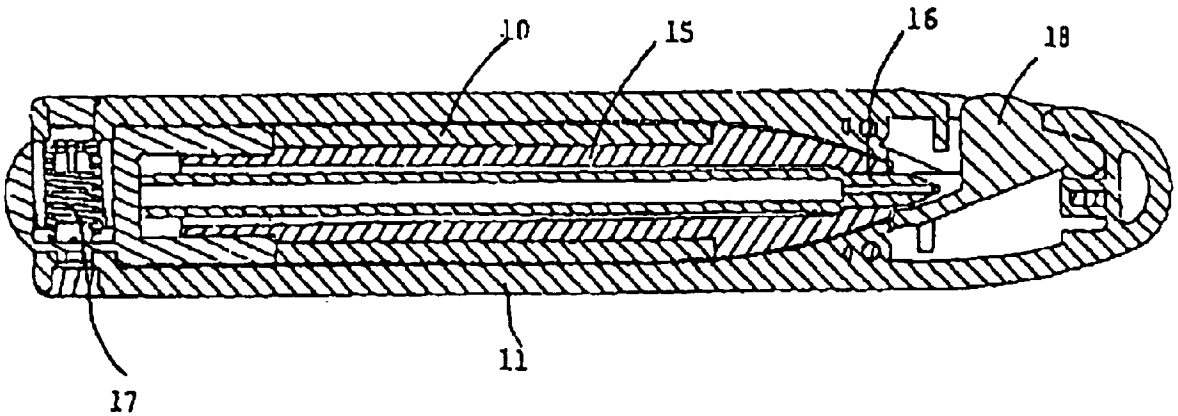
FIG. 6 is another sectional view of the pen in the folded configuration.

In FIGS. 5 and 6, the various componenents of the pen are shown and it will be apparent how the pen is retained in and released from its folded configuration. It can also be seen that the shank 10 has an integrally formed abutment 19 that will bear against a stop 20 integrally formed on the handle. The abutment 19 will be urged by the spring 17 against the stop 20 when the pen is in a fully open configuration for writing.

The described pen can therefore be folded, and held folded, to fit comfortably in a wallet or shallow pocket, for example. For use, the button 18 is depressed to allow the pen to open and provide a pen of 'comfortable' length for writing. The writing head 16, and indeed the element 14, is well-protected and covered over by the handle 11 when the pen is in the folded configuration. The handle is permanently attached to the shank and so cannot be lost or independently misplaced.

I claim:

1. A writing implement having a writing head supported by an elongate shank, the shank having a shank remote end opposite a shank connector end, and an elongate handle, the handle having a handle connector end opposite a handle remote end, said handle connector and shank connector ends fit end-to-end in a writing configuration for normal use, wherein the handle is pivotably connected to the shank and folds over the shank and is held against the shank when the implement is in a folded configuration and said handle has a cooperative engaging locking means at the handle remote end for releasable engagement and locking retention of the handle to the shank at the shank remote end when the handle is folded over the shank *wherein actuation of said engaging locking means releases said shank to automatically pivot from said folded configuration to said writing configuration*.

2. A writing implement according to claim 1, in which the handle is pivotably connected to the shank by a pivotable connection which is spring biased to restrain the shank and handle towards the writing configuration.

3. A writing implement according to claim 1, in which the handle extends over an end of the shank and the writing head in the folded configuration.

4. A writing implement according to claim 1, including a pocket clip mounted to and extending along a side of the handle.

*5. A writing implement comprising:*

*a writing element having an elongate shank, the writing element having a writing head at a remote end opposite a connector end, and an elongate handle, the handle having a handle connector end opposite a handle remote end, said handle connector and writing element connector ends fit end-to-end in a writing configuration for normal use,*

*wherein the handle is pivotably connected to the writing element and folds over the writing element and is held adjacent to the writing element when the implement is in a folded configuration, and*

*said handle has a cooperative engaging locking means at the handle remote end for releasable engagement and locking retention of the handle to the remote end of said writing element when the handle is folded over the writing element, and wherein actuation of said engaging locking means releases said shank to automatically pivot from said folded configuration to said writing configuration.*

*6. A writing implement according to claim 5, in which the handle is pivotably connected to the writing element by a pivotable connection which is spring biased to urge the writing element and handle towards the writing configuration.*

*7. A writing implement according to claim 5, in which the handle extends over the writing head in the folded configuration.*

*8. A writing implement according to claim 5, including a pocket clip mounted to and extending along a side of the handle.*

*9. A writing implement comprising:*

*a writing portion comprising a connector end and a remote end opposite said connector end;*

*a handle comprising a handle connector end and a handle remote end opposite said handle connector end;*

*said handle pivotally connected to said writing portion proximate said handle connector end and said writing portion connector end;*

*means for biasing said writing portion from a folded position, wherein said writing portion is at least partially disposed within a portion of said handle, to an extended writing position; and*

*means for releaseably engaging said writing portion proximate said remote end of said writing portion for locking said writing portion in said folded position wherein actuation of said engaging means releases said writing portion to automatically pivot from said folded position to said extended writing position.*

*10. A writing implement according to claim 9 wherein said writing portion comprises a ball point pen.*

*11. A writing implement according to claim 9 wherein said writing portion comprises a replaceable ball point element.*

*12. A writing implement according to claim 9 wherein said handle has a hole passing through said handle proximate said handle remote end.*

*13. A writing implement according to claim 9 wherein said engaging means is positioned proximate said handle remote portion.*

*14. A writing implement according to claim 13 wherein said engaging means comprises a button.*

*15. A writing implement according to claim 13 wherein said writing portion pivots through an opening on a rear side of said handle and said engaging means comprises a button positioned on a side of said handle.*

*16. A writing implement according to claim 9 wherein said engaging means comprises a button.*

*17. A writing implement according to claim 16 wherein said writing portion pivots through an opening on a rear side of said handle and said engaging means comprises a button positioned on a side of said handle.*

*18. A writing implement according to claim 9 further comprising a pocket clip.*

*19. A writing implement according to claim 18 wherein said clip is positioned on a front side of said handle, opposite a rear side through which said writing portion pivots.*

*20. A writing implement according to claim 18 wherein said handle comprises a hole passing through said handle proximate said handle remote end, said engaging means comprises a button, and wherein said pocket clip is connected to said handle intermediate said hole and said button.*

*21. A writing implement according to claim 18 wherein said clip and said handle collectively surround a majority of the circumference of said writing portion.*

*22. A writing implement according to claim 9 wherein said engaging means is manually releasable.*

*23. A writing implement according to claim 9 wherein said handle comprises a hole passing through said handle remote portion and positioned further from said handle connector end than said engaging means.*

*24. A writing implement according to claim 9 wherein said biasing means comprises a spring.*

* * * * *